United States Patent
Furman

(10) Patent No.: US 6,464,828 B1
(45) Date of Patent: Oct. 15, 2002

(54) POLYESTER WATER-BASED DEFOAMER

(75) Inventor: Robert Furman, Columbsu, GA (US)

(73) Assignee: Callaway Chemical Corp., Columbus, GA (US)

( * ) Notice: Subject to any disclaimer, the term of this patent is extended or adjusted under 35 U.S.C. 154(b) by 0 days.

(21) Appl. No.: 09/517,126

(22) Filed: Mar. 1, 2000

Related U.S. Application Data

(60) Provisional application No. 60/122,123, filed on Mar. 1, 1999.

(51) Int. Cl.$^7$ .............................. D21C 3/28; C08L 67/00
(52) U.S. Cl. ........................... 162/75; 252/61; 524/601; 528/295.3
(58) Field of Search ............................ 162/4, 5, 10, 17, 162/24, 25, 26, 27, 60, 70, 71, 72, 75, 76, 77; 516/113, 115, 135, 141, 73; 252/8.81, 60, 61; 523/500, 501; 528/295.5, 295.3; 106/219, 221, 243, 244; 524/601

(56) References Cited

U.S. PATENT DOCUMENTS

| | | | | |
|---|---|---|---|---|
| 3,098,827 A | * | 7/1963 | Kirkpatrick et al. ........ | 516/167 |
| 4,324,734 A | * | 4/1982 | Rehm et al. ................. | 560/198 |
| 4,634,450 A | * | 1/1987 | Ljusberg-Wahren ........... | 44/51 |
| 4,968,448 A | * | 11/1990 | Svarz ......................... | 516/133 |
| 5,460,698 A | * | 10/1995 | Nguyen ...................... | 162/158 |
| 5,501,769 A | * | 3/1996 | Blackstone et al. ........... | 162/76 |
| 5,736,622 A | * | 4/1998 | Wallberg et al. .......... | 528/295.5 |
| 5,868,826 A | * | 2/1999 | Fischer et al. ............... | 106/237 |
| 6,057,375 A | * | 5/2000 | Wollenweber et al. ....... | 516/133 |

* cited by examiner

Primary Examiner—Peter Chin
Assistant Examiner—Eric Hug
(74) Attorney, Agent, or Firm—Bruce F. Jacobs

(57) ABSTRACT

Polyester water-based defoamers are prepared by reaction of a dimer fatty acid, a fatty acid and two different polyalkylene polyols, e.g. polypropylene glycol and polyethylene glycol. The resulting polyesters are readily dispersible in water to form a water-based macroemulsion in the absence of any oil or short chain alcohols. The macroemulsion is an effective defoamer in ground-wood and thermomechanical pulping operations.

37 Claims, No Drawings

POLYESTER WATER-BASED DEFOAMER

This application claims the benefit of U.S. Provisional Application(s) No(s).: 60/122,123 filing date Mar. 1, 1999.

FIELD OF THE INVENTION

The present invention is directed to a defoamer composition which does not contain any oils or short chain ($C_{2-6}$) alcohols for use in groundwood and thermomechanical pulping operations.

DESCRIPTION OF THE PRIOR ART

The problem of foam in pulping operations is a continuing one, particularly in groundwood and thermomechanical pulping. Heretofore in these mechanical pulping processes (in contrast to chemical (sulfate) "Kraft" pulping processes), the foam problem has been most effectively dealt with by using polyethylene glycol fatty acid esters which are generally dispersible in water. The esters have been made into stable microemulsions only by the use of undesirable mineral oils and/or short chain alcohols, e.g. iso-propyl or butyl alcohol. Typically, these microemulsions have an overall composition of about 30 to 60% by weight polyethylene glycol fatty acid ester, 5 to 20% oil, 5 to 20% alcohol, and 20 to 45% water. While an oil and/or alcohol are needed to manufacture the microemulsion defoamers, the presence of oil/alcohol is quite undesirable. The oil, in addition to causing environmental problems, has been known to cause spotting and surface tension problems with the pick-up rolls, and the short chain alcohols are either flammable or combustible causing the microemulsions to present a fire danger.

Thus an effective defoamer product for groundwood and thermomechanical pulping mills is needed which contains neither oil nor short chain alcohols. However, the industry has not been able to produce a stable emulsion product from the polyethylene glycol fatty acid esters in the absence of the oil and alcohol, which product has been an effective defoamer.

A defoamer that is generally cheaper than a microemulsion defoamer on a cost per pound basis plus does not contain oil or short chain alcohols is a water-based macroemulsion defoamer. These defoamers are widely used in screen rooms, paper machines, and effluent streams of Kraft mills. They generally contain 10 to 30% fatty alcohols ($C_{12}$ to $C_{24}$) and/or 1 to 10% saturated fatty acids ($C_{12}$ to $C_{24}$) and/or 1 to 3% long chain hydrocarbon (waxes) and 1 to 5% emulsifiers such as ethoxylated alcohols, fatty acids soaps, and ethoxylated fatty acid esters.

When Kraft mill macroemulsion defoamers are used in groundwood and thermomechanical pulp mills, they generally have been found not to work in adequately reducing foam and those few that have worked as defoamers have required such large quantities that they have not been sufficiently cost effective to be commercially acceptable.

Accordingly, the groundwood and thermomechanical pulp mills have long desired a water-based defoamer that does not contain oil and/or short chain alcohols and is cost effective in comparison with the currently used traditional defoamers. It is the object of the present invention to produce such a defoamer and to utilize it in groundwood and thermomechanical pulping mill operations.

SUMMARY OF THE INVENTION

The present invention is directed to a water-based defoamer composition which comprises a polyester polymer prepared by reacting (i) a dimer fatty acid and (ii) a fatty acid with (iii) a mixture of at least two polyalkylene polyols. The resulting polymer is readily water-dispersible and forms a macroemulsion in the absence of any oil and short chain alcohols. The polymer defoamer composition can be prepared by simply mixing about 10 to about 35% of the polymer into water.

DESCRIPTION OF THE PREFERRED EMBODIMENTS

Macroemulsions and microemulsions are readily distinguishable. A macroemulsion is generally opaque in view of the particles generally being about 400 or more microns in average diameter, whereas a microemulsion is generally transparent, in part because the particles are generally less than about 100 microns in average diameter.

A preferred dimer fatty acid suitable for this invention is a $C_{36}$ aliphatic dibasic acid whose structure is essentially that of a long chain dicarboxylic acid with two alkyl side chains. It is derived from tall oil, animal, vegetable, or marine fats and oils, with the dimer fatty acid of tall oil being preferred.

Suitable dimer fatty acids are of the general formula:

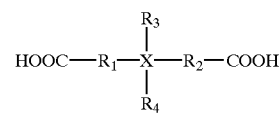

wherein $R_1$ and $R_2$ are each aliphatic groups containing about 8 to 12 carbon atoms, preferably 9; $R_3$ and $R_4$ are each alkyl side chains containing about 4 to 8 carbon atoms, preferably 6; X is selected from the group consisting of a single carbon-carbon bond, an ethylenic carbon-carbon double bond, or a monocyclic, acyclic, or bicyclic structure containing 4 to 8 carbon atoms, preferably 6; and at least one ethylenic bond. While the structure may be acyclic or bicyclic, the monocyclic structure is preferred.

The dimer fatty acid structure results from the dimerization of two unsaturated fatty acid molecules that form the dimer acid. The exact nature of the X linkage formed by the dimerization has not been completely defined. It may be as simple as a single carbon-to-carbon bond or as complex as a cyclic structure depending on factors such as the type of unsaturated fatty acid used and process conditions such as temperature and catalyst type. A suitable dimer fatty acid is available commercially as Empol® Dimer Acid from Henkel.

The fatty acid suitable for this invention is derived from tall oil, animal, vegetable, or marine fats and oils. Suitable fatty acids are of the general formula:

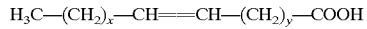

wherein x and y are integers such that the fatty acid contains a total of 8 to 22 carbon atoms, preferably 18. Alternatively, the fatty acid may be saturated or poly-unsaturated.

The dimer acid and fatty acid are reacted with compounds containing alcoholic hydroxyl groups to form the polyester. Co-monomers suitable to prepare the polymer are a mixture of at least two polyalkylene polyols having 2 to about 6 carbon atoms in the alkylene groups. Particularly suitable polyols are polyoxyethylene glycol of a molecular weight 200 to 1000, preferably 200 to 600; polyoxypropylene glycol of a molecular weight 400 to 4000, more preferably 1000 to 3000; polyoxypropylene triol of a molecular weight 400 to 4000, preferably 1000 to 3000; polypropylene-polyethylene glycol of a molecular weight 400 to 4000, preferably 1000 to 3000; and polyoxybutylene glycol of a molecular weight 400 to 4000, preferably 1000 to 3000.

The polyester polymer may be prepared in any suitable manner, but generally all the monomers including the fatty acid may be charged into a reaction kettle along with a conventional catalyst such as methanesulfonic acid, para-toluenesulfonic acid, hypophosphorous acid, or organotin derivatives. In addition, strong acids such as sulfuric and phosphoric acid may be used as the catalysts. With mixing and nitrogen sparge, the reactants are heated to about 300 to 400° F. and held at that temperature until the acid value is sufficiently low. During the reaction water is removed, e.g. by means of a condenser and moisture trap.

The ratio of dimer fatty acid to fatty acid is generally about 1.1:1 to 10:1, preferably about 1.5:1 to about 3:1. The polyalkylene polyol polymers are generally used in a ratio of about 1:10 to about 10:1, preferably about 1:2 to about 2:1. The dimer fatty acid and fatty acid are used in slight molar excess to the polyols, e.g. about 5 to about 15%.

While the resulting 100% active polymer may be stored neat and then diluted extensively for use on site, preferably it is mixed into water to produce a water-based macroemulsion containing about 10 to 35% by weight polymer and about 90 to 65% water, and then it is this macroemulsion which is diluted immediately prior to use. To form the macroemulsion, the polymer, which may be end-terminated with either acid or hydroxy groups, is mixed into water with stirring, generally at about 80 to 100° F. The stability and viscosity of the water-based macroemulsion defoamer may be controlled by the addition of additives such as thickening agents and the like. Suitable thickening agents include such as xanthan gum or polyacrylic acid neutralized by adding a suitable base such as sodium hydroxide, potassium hydroxide, ammonia, diethanolamine, or the like. Mixing for about 1 hour produces a stable, water-based defoamer macroemulsion with a viscosity in the range of about 200 to 1000 cp, preferably 300 to 600 cp, as determined by Brookfield Viscometer. There is no significant increase in viscosity and no separation for at least 3 months at room temperature, preferably at least 6 months.

Other potential additives include fatty alcohols ($C_{10-24}$) and emulsifiable silicones. Generally these are used in small amounts, i.e. about 1 to 5% by weight based on the total weight of the macroemulsion. In addition, even smaller amounts, i.e. about 0.5 to 2% by weight, of a high melting wax may also be present.

The defoamer compositions of this inventions have particular utility in controlling foam and air entrainment in groundwood and thermomechanical pulping and paper making operations. Generally, the defoamer will find primary use in treating foams that could not previously be treated with water-based defoamers due to ineffectiveness and/or deposit build-up.

The diluted defoamer composition may be added to the system neat, or it may be further diluted with water, though generally there is no necessity to do so. Application points are best determined by on site inspection of foaming problems unique to that mill.

The quantity of the defoamer compositions required to control foam will obviously vary depending upon the specific nature of the foam to be treated and the individual components used to prepare the defoamers. Generally, however, a quantity of defoamer macroemulsion of from about 50 to 500 ml/min will be suitable, preferably 75 to 200 ml/min.

EXAMPLE 1

Prepatation of Polyester

A 650 g batch of polyester comprised of 0.7 moles dimer fatty acid (MW 580) and 0.4 moles of oleic acid (MW 280) was reacted with 0.5 moles of polypropylene glycol (MW 2000) (PPG-2000) and 0.5 moles of polyethylene glycol (MW 400)(PEG-400).

377.65 g of PPG-2000, 74.75 g of PEG-400, 42.90 g of oleic acid, 152.74 g of dimer fatty acid, and 1.95 g of p-toluenesulfonic acid, 65%, were charged into a reaction kettle. With mixing and nitrogen sparge the reactants were heated to 380° F. and held at that temperature until the acid value was 5.0. During the reaction the water that evolved was removed with a condenser and moisture trap. The polyester was cooled to 80° F. and produced a clear, dark, amber liquid having a viscosity of 3300 cps as measured by a Brookfield Viscometer, spindle#6, at 50 rpm.

EXAMPLE 2

To evaluate the polymer of Example 1 as a defoamer in comparison with a polyethylene glycol fatty acid concentrate, a foam cell tester was used. The foam cell tester uses a graduated glass cylinder incremented every 0.5 cm for 30 cm with the bottom of the cylinder fitted with a piece of rubber tubing attached to a steel pipe leading to a centrifugal pump. Another piece of piping, with an aspirator led out of the top of the pump and into the top of the cylinder.

Black liquor from the first stage filtrate of Union Camp's Savannah, Ga, plant was diluted in tap water to 2.0%. The 2.0% black liquor was heated to 120° F. and poured into the glass cylinder to 15 cm. The pump was connected to a rheostat which was set at 65%. Using a micropipettor, 60 microliters of the concentrate was carefully dropped onto the surface of the dilute black liquor. The foam cell was turned on and the 2.0% black liquor was sucked into the pump and circulated into the top of the glass cylinder creating foam. When the foam cell was turned on, a timer was started. The time it took the foam to rise from 15 cm to 18 cm was recorded. The longer the time the better the defoamer.

The polyester of Example 1 was compared to polyethylene glycol (PEG400) ditallate which is typical of the esters currently used in microemulsion defoamers at groundwood and thermomechanical paper mills.

|   | DEFOAMER | STAMINA |
|---|----------|---------|
| 1 | PEG-400 Ditallate | Typical |
| 2 | Polyester | Superior |

EXAMPLE 3

The procedures of Examples 1 and 2 were repeated to prepare and evaluate a series of different polyesters for their defoaming capacity. The polyesters prepared were as in Example 1 except, that in Defoamer A there was only dimer acid and no oleic acid; in Defoamer B the amount of the PPG-2000 was increased to 0.6 moles and the amount of the PEG-400 was decreased to 0.4 moles; for Defoamer C all of the PPG-2000 was replaced by PEG-400; and for Defoamer D the PEG-400 was replaced with a higher molecular weight PEG-600.

|   | DEFOAMER | STAMINA |
|---|---|---|
| 1 | PEG 400 ditallate | Standard |
| 2 | A | Inferior |
| 3 | Example 1 | Superior |
| 4 | B | Better than Ex. 1 |
| 5 | C | Worse than Ex. 1; Better than Standard |
| 6 | D | Worse than Ex. 1; Better than Standard |

EXAMPLE 4

Another 650 g batch of polyester was prepared as in Example 1 but using reacting 0.7 moles of the dimer fatty acid and 0.4 moles of oleiciacid with 0.7 moles PPG-2000 and 0.3 moles of PEG-400. To improve the color, 0.1% hypophosphorous acid, 50%, was added. The final polyester was slightly hazy and had a light amber color. The viscosity was 4400 cps as measured by a Brookfield Viscometer.

250 g of the water-based defoamer was prepared. 183.75 g of tap water at 90° F. was charged into a 400 ml beaker. Using a Lightning Mixer with metal shaft and metal mixing blade, stirring of the water began. 27.5 g of the polyester from Ex. 4 and 12.5 g of the polyester from Ex. 1 were charged into the beaker. The polymers were mixed for 15 minutes. 3 g of 30% aqueous solution of a polyacrylic acid was charged followed by 0.75 g of diethanolamine. This was mixed for 45 minutes.

The final product was a 16% active, opaque, off-white macroemulsion with a viscosity of 410 cps as measured by a Brookfield Viscometer, spindle #3, ram 50.

EXAMPLE 5

The water-based defoamer as prepared in Ex. 4 was compared to a typical microemulsion defoamer produced by Callaway Chemical Company. The microemulsion contained a combination of PEG ditallate esters at 49% active, plus mineral oil and short chain alcohols.

|   | DEFOAMER | STAMINA |
|---|---|---|
| 1 | Microemulsion | Standard |
| 2 | Defoamer of Ex. 4 | Superior |

EXAMPLE 6

Five gallons of the water-based defoamer in Example 4 was prepared. The defoamer was tested at a groundwood mill in Augusta, Ga, which currently uses a Callaway microemulsion which was tested in the foam cell in Example 5. The water-based defoamer was applied in the same way as the microemulsion, that is, neat to the #2 paper machine at mail/min. The water-based defoamer ran about 2.5% less than the microemulsion, but ran well within operating parameters. This had never been accomplished before with an oil-free defoamer.

Considering that the water-based defoamer of Example 4 had only 16% active polymer while the microemulsion had 40% active polymer, there is an even greater cost advantage. Also, the defoamer of Example 4 contained no oil or short chain alcohols.

EXAMPLE 7

250 g of a water-based defoamer was prepared. 146.63 g of tap water at 90° F. was charged into a 400 ml beaker. Following the procedure of Example 4, water was stirred and then 20 g of the polyester from Example 1 and 17.5 g of the polyester from Example 4 were charged into the beaker and mixed 15 minutes. 62.5 g of a fatty alcohol emulsion (containing 3.3 g fatty alcohol ($C_{12}$–$C_{24}$), 0.6 g alpha-olefin $C_{30}$ or greater, and 0.5 g of an ethoxylated sorbitan monooleate and water) were charged into the beaker and mixed 15 minutes. 3.5 g of a 30% polyacrylic acid and 0.35 g of diethanolamine were charged and mixed 45 minutes.

The final product was a 18.9% active, opaque, white macroemulsion having a viscosity of 550 cp @ 80F as measured by a Brookfield viscometer, spindle #3, rpm 50.

EXAMPLE 8

Ten gallons of the product of Example 7 was prepared. The procedure of Example 6 was repeated except using the composition of Example 7. The macroemulsion ran equal to the currently used microemulsion.

What is claimed is:

1. A water-based defoamer composition comprising a macro-emulsion of about 10 to 35% by weight polyester polymer dispersed in water, said polyester polymer being prepared by the reaction of (i) a dimer fatty acid and (ii) a fatty acid with (iii) a mixture of at least two polyalkylene polyols each having 2 to about 6 carbon atoms in the alkylene groups, wherein the ratio of dimer fatty acid to fatty acid is about 1.1:1 to 10:1.

2. The defoamer composition of claim 1, wherein the dimer fatty acid is

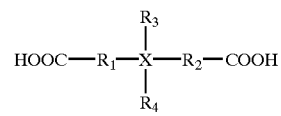

wherein $R_1$ and $R_2$ are each aliphatic groups containing about 8 to 12 carbon atoms; $R_3$ and $R_4$ are each alkyl side chains containing about 4 to 8 carbon atoms; X is selected from the group consisting of a single carbon-carbon bond, an-ethylenic carbon-carbon double bond, and a monocyclic, acyclic, or bicyclic structure containing about 4 to about 8 carbon atoms and at least one ethylenic bond.

3. The defoamer composition of claim 2, wherein at least one of $R_1$ and $R_2$ has 9 carbon atoms and at least one of $R_3$ and $R_4$ has 6 carbon atoms.

4. The defoamer composition of claim 2, wherein the dimer fatty acid is a $C_{36}$ aliphatic dibasic acid whose structure is essentially that of a long chain dicarboxylic acid with two alkyl side chains.

5. The defoamer composition of claim 4, wherein the dimer fatty acid is derived from tall oil.

6. The defoamer composition of claim 1, wherein the fatty acid is of the general formula:

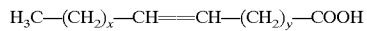

wherein x and y are integers such that the fatty acid contains a total of 8 to about 22 carbon atoms.

7. The defoamer composition of claim 6, wherein the fatty acid contains a total of about 18 carbon atoms.

8. The defoamer composition of claim 1, wherein the fatty acid is poly-unsaturated.

9. The defoamer composition of claim 1, wherein each of the polyalkylene polyols are selected from the groups consisting of polyoxyethylene glycol of a molecular weight 200 to 1000, polyoxypropylene glycol of a molecular weight 400 to 4000, polyoxypropylene triol of a molecular weight 400 to 4000, polypropylenepolyethylene glycol of a molecular weight 400 to 4000, and polyoxybutylene glycol of a molecular weight 400 to 4000.

10. The defoamer composition of claim 1, wherein the polyalkylene polyols are selected from the groups consisting of polyoxyethylene glycol of a molecular weight 200 to 600; polyoxypropylene glycol of a molecular weight 1000 to 3000; polyoxypropylene triol of a molecular weight 1000 to 3000; poly-propylene-polyethylene glycol of a molecular weight 1000 to 3000; and polyoxybutylene glycol of a molecular weight 1000 to 3000.

11. The defoamer composition of claim 1, wherein the ratio of dimer fatty acid to fatty acid is about 1.5:1 to about 3:1.

12. The defoamer composition of claim 1, wherein the ratio of polyalkyiene polyols is about 1:10 to about 10:1.

13. The defoamer composition of claim 1, wherein the ratio of polyalkylene polyols is about 1:2 to about 2:1.

14. The defoamer composition of claim 1 in the absence of any oil and short chain alcohols.

15. The defoamer composition of claim 1, further containing at least one additive selected from the group of thickening agents, fatty alcohols ($C_{10-24}$), emulsifiable silicone polymers, and a high melting point wax.

16. The defoamer composition of claim 15, wherein the fatty alcohols ($C_{10-24}$) are emulsifiable silicone polymers are present in an amount of about 1 to 5% by weight based on the total weight of the composition.

17. The defoamer composition of claim 15, wherein the wax is present in an amount of about 0.5 to 2% by weight based on the total weight of the composition.

18. The defoamer composition of claim 1, wherein the viscosity is about 200 to 1000 cp as determined by Brookfield Viscometer and there is no significant increase in viscosity and no separation after storage for at least 3 months at room temperature.

19. A method of controlling foam in a groundwood pulping process comprising diluting the defoamer composition of claim 1 with water and adding the diluted composition to the pulp in an amount which is sufficient to control the foam.

20. A method of controlling foam in a thermomechanical pulping process comprising diluting the defoamer composition of claim 1 with water and adding the diluted composition to the pulp in an amount which is sufficient to control the foam.

21. A water-based defoamer composition comprising a macro-emulsion of about 10 to 35% by weight polyester polymer dispersed in water, said polyester polymer being prepared by the reaction of (i) a dimer fatty acid and (ii) a fatty acid with (iii) a mixture of at least two polyalkylene polyols each having 2 to about 6 carbon atoms in the alkylene groups, wherein the composition has a viscosity of about 200 to 1000 cp as determined by Brookfield Viscometer and there is no significant increase in viscosity and no separation after storage for at least 3 months at room temperature.

22. The defoamer composition of claim 21, wherein the dimer fatty acid is

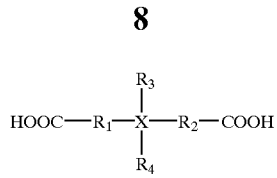

wherein $R_1$ and $R_2$ are each aliphatic groups containing about 8 to 12 carbon atoms; $R_3$ and $R_4$ are each alkyl side chains containing about 4 to 8 carbon atoms; X is selected from the group consisting of a single carbon-carbon bond, an ethylenic carbon-carbon double bond, and a monocyclic, acyclic, or bicyclic structure containing about 4 to about 8 carbon atoms and at least one ethylenic bond.

23. The defoamer composition of claim 22, wherein at least one of $R_1$ and $R_2$ has 9 carbon atoms and at least one of $R_3$ and $R_4$ has 6 carbon atoms.

24. The defoamer composition of claim 22, wherein the dimer fatty acid is a $C_{36}$ aliphatic dibasic acid whose structure is essentially that of a long chain dicarboxylic acid with two alkyl side chains.

25. The defoamer composition of claim 24, wherein the dimer fatty acid is derived from tall oil.

26. The defoamer composition of claim 21, wherein the fatty acid is of the general formula:

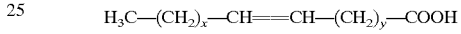

wherein x and y are integers such that the fatty acid contains a total of 8 to about 22 carbon atoms.

27. The defoamer composition of claim 26, wherein the fatty acid contains a total of about 18 carbon atoms.

28. The defoamer composition of claim 21, wherein the fatty acid is polyunsaturated.

29. The defoamer composition of claim 21, wherein the ratio of dimer fatty acid to fatty acid is about 1.5:1 to about 3:1.

30. The defoamer composition of claim 21, wherein the ratio of polyalkylene polyols is about 1:10 to about 10:1.

31. The defoamer composition of claim 21, wherein the ratio of polyalkylene polyols is about 1:2 to about 2:1.

32. The defoamer composition of claim 21 in the absence of any oil and short chain alcohols.

33. The defoamer composition of claim 21, further containing at least one additive selected from the group of thickening agents, fatty alcohols ($C_{10-24}$), emulsifiable silicone polymers, and a high melting point wax.

34. The defoamer composition of claim 33, wherein the fatty alcohols ($C_{10-24}$) are emulsifiable silicone polymers are present in an amount of about 1 to 5% by weight based on the total weight of the composition.

35. The defoamer composition of claim 33, wherein the wax is present in an amount of about 0.5 to 2% by weight based on the total weight of the composition.

36. A method of controlling foam in a groundwood pulping process comprising diluting the defoamer composition of claim 21 with water and adding the diluted composition to the pulp in an amount which is sufficient to control the foam.

37. A method of controlling foam in a thermomechanical pulping process comprising diluting the defoamer composition of claim 21 with water and adding the diluted composition to the pulp in an amount which is sufficient to control the foam.

* * * * *